United States Patent
Coffey et al.

(10) Patent No.: US 9,359,535 B2
(45) Date of Patent: Jun. 7, 2016

(54) POLYOLEFIN ADHESIVE COMPOSITIONS

(71) Applicant: ExxonMobil Chemical Patents Inc., Baytown, TX (US)

(72) Inventors: James N. Coffey, League City, TX (US); George Rodriguez, Houston, TX (US); Phillip T. Matsunaga, Houston, TX (US); Mun Fu Tse, Seabrook, TX (US); Shawn W. Mowry, Houston, TX (US); Jean-Roch H. Schauder, Wavre (BE); Yann Devorest, Waterloo (BE); Jurgen J. M. Schroeyers, Helchteren (BE); Joseph M. DeLucia, Pittsburgh, PA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/377,984

(22) PCT Filed: Feb. 28, 2013

(86) PCT No.: PCT/US2013/028255
§ 371 (c)(1),
(2) Date: Aug. 11, 2014

(87) PCT Pub. No.: WO2013/134038
PCT Pub. Date: Sep. 12, 2013

(65) Prior Publication Data
US 2015/0322303 A1  Nov. 12, 2015

Related U.S. Application Data

(60) Provisional application No. 61/609,020, filed on Mar. 9, 2012.

(51) Int. Cl.
C09J 123/12 (2006.01)
C09J 123/14 (2006.01)
C08L 23/14 (2006.01)
C08F 6/04 (2006.01)

(52) U.S. Cl.
CPC ............... C09J 123/12 (2013.01); C08F 6/04 (2013.01); C08L 23/142 (2013.01); C09J 123/142 (2013.01); C08L 2205/025 (2013.01); C08L 2207/10 (2013.01)

(58) Field of Classification Search
CPC ......... C08L 23/10; C08L 23/12; C08L 23/14; C08L 23/142; C08L 23/18; C08L 23/02; C08L 2205/025; C08L 2207/10; C08L 23/16; C08F 6/04; C09J 123/10; C09J 123/14; C09J 123/142; C09J 123/12; C09J 123/18
See application file for complete search history.

(56) References Cited

U.S. PATENT DOCUMENTS

| | | | |
|---|---|---|---|
| 4,540,753 A | 9/1985 | Cozewith et al. | |
| 6,525,157 B2 | 2/2003 | Cozewith et al. | |
| 6,881,800 B2 | 4/2005 | Friedersdorf | |
| 7,033,152 B2 | 4/2006 | Eloo et al. | |
| 7,163,989 B2 | 1/2007 | Friedersdorf | |
| 7,226,553 B2 | 6/2007 | Jackson et al. | |
| 7,232,871 B2 | 6/2007 | Datta et al. | |
| 7,294,681 B2 | 11/2007 | Jiang et al. | |
| 7,470,118 B2 | 12/2008 | Fukutani et al. | |
| 7,524,910 B2 | 4/2009 | Jiang et al. | |
| 2009/0163642 A1* | 6/2009 | Kiss ..................... | B01J 19/0006 524/525 |
| 2010/0152360 A1 | 6/2010 | Jiang et al. | |

FOREIGN PATENT DOCUMENTS

EP   0629632   12/1994

OTHER PUBLICATIONS

Appendix I of "Size Exclusion Chromatography" by S. Mori and H. G. Barth (Springer).
H.N. Cheng, Macromolecules, 17, pp. 1950 (1984).
Verstrate et al., Macromolecules, 21, pp. 3360 (1988).
Wheeler & Willis, Applied Spectroscopy, vol. 47, pp. 1128-1130 (1993).
T. Sun, P. Brant, R.R. Chance, and W.W. Graessley, Macromolecules, vol. 34, No. 19, pp. 6812-6820 (2001).
J.C. Randall, Polymer Reviews, vol. 29, No. 2, pp. 201-317 (1989).
T. Sugano, Y. Gotoh, and T. Fujita, Makromol. Chem., vol. 193, pp. 43-51 (1992).

* cited by examiner

Primary Examiner — Irina S Zemel
Assistant Examiner — Jeffrey Lenihan
(74) Attorney, Agent, or Firm — Chad A. Guice; Priya G. Prasad

(57) ABSTRACT

A multi-modal polymer blend for use in an adhesive composition comprising at least two compositionally different propylene-based polymers. The multi-modal polymer blend has a Mw of about 10,000 g/mol to about 150,000 g/mol. When subjected to Temperature Rising Elution Fractionation, the multi-modal polymer blend exhibits a first fraction that is soluble at −15° C. in a hydrocarbon solvent, such as xylene or ortho-dichlorobenzene, the first fraction having an isotactic (mm) triad tacticity of about 70 mol % to about 90 mol %; and a second fraction that is insoluble or less soluble than the first fraction at −15° C. in the hydrocarbon solvent, the second fraction having an isotactic (mm) triad tacticity of about 85 mol % to about 98 mol %.

23 Claims, 7 Drawing Sheets

TREF-GPC curve Comparative I.

POLYOLEFIN ADHESIVE COMPOSITIONS

PRIORITY CLAIMS

This application claims priority to U.S. patent application Ser. No. 61/609,020 filed Mar. 9, 2012 and International Patent Application PCT/US2013/028255 filed Feb. 28, 2013, which are incorporated by reference herein in their entireties.

FIELD OF INVENTION

The invention relates to a polyolefin adhesive component composition that is a blend of at least two olefin-based polymers.

BACKGROUND

Adhesive composition components, such as base polymers, tackifiers, and waxes are customarily provided as separate components for formulation into an adhesive composition. For hot melt adhesive (HMA) application systems, the base polymer is often supplied in the form of solid pellets, which may be melted and combined with the other adhesive components.

In HMA applications, adhesive compositions are sought that provide a desired combination of physical properties, such as reduced set time and improved mechanical strength. Exemplary base polymer compositions for HMA applications and methods for producing such base polymers are disclosed in U.S. Pat. Nos. 7,294,681 and 7,524,910. Various polymers described in these patents and/or produced by the methods disclosed in these patents have been sold by Exxon-Mobil Chemical Company as LINXAR™ polymers. In addition, the process platform described in these patents can sometimes be of limited robustness for developing new products or altering product design to satisfy customer needs.

What is desired, therefore, is a new base polymer for adhesives that have equivalent or better adhesive performance attributes to that of the LINXAR™ polymers and those polymers disclosed in U.S. Pat. Nos. 7,294,681 and 7,524,910, and can be produced on alternate platforms to provide a more robust process platform.

SUMMARY

The foregoing and/or other challenges are addressed by the methods and products disclosed herein.

In one aspect, a multi-modal polymer blend is provided for use in an adhesive composition. The polymer blend includes a first predominantly propylene-based polymer, wherein the first predominantly propylene-based polymer is a homopolymer of propylene or comprises a comonomer of ethylene or a $C_4$ to $C_{10}$ alpha-olefin; and a second predominantly propylene-based polymer, wherein the second predominantly propylene-based polymer is a homopolymer of propylene or comprises a comonomer of ethylene or a $C_4$ to $C_{10}$ alpha-olefin; wherein the second predominantly propylene-based polymer is compositionally different than the first predominantly propylene-based polymer. The multi-modal polymer blend has a Mw of about 10,000 g/mol to about 150,000 g/mol, and a heat of fusion between about 10 J/g to about 90 J/g. When subjected to Temperature Rising Elution Fractionation, the multi-modal polymer blend exhibits: a first fraction that is soluble at −15° C. in a hydrocarbon solvent, such as xylene or ortho-dichlorobenzene, the first fraction having an isotactic (mm) triad tacticity of about 70 mol % to about 90 mol %; and a second fraction that is insoluble or less soluble than the first fraction at −15° C. in the hydrocarbon solvent, the second fraction having an isotactic (mm) triad tacticity of about 85 mol % to about 98 mol %.

These and other aspects of the present inventions are described in greater detail in the following detailed description and are illustrated in the accompanying drawings.

DETAILED DESCRIPTION

It has been discovered that certain multi-modal polymer blends having a unique and desirable combination of advantageous properties for adhesive applications, including set times and mechanical strength equivalent to or better than LINXAR™ polymers, may be produced using a new process platform that is more robust and lacks many of the limitations and difficulties associated with the processes employed to make LINXAR™ polymers and those disclosed in U.S. Pat. Nos. 7,294,681 and 7,524,910.

Advantageously, polymers can be produced using the new process platform that share many of the characteristics of the LINXAR™ polymers that make the LINXAR™ polymers excellent polymers for use in adhesive applications. New polymers can be produced using the new process platform that possess other characteristics that, although differentiate the polymers from the LINXAR™ polymers, are believed to contribute to the new polymers' excellent adhesive performance. For example, polymers may be produced using the new process platform that are multi-modal polymer blends of at least two different polymers in which the blend has a Mw of about 10,000 g/mol to about 150,000 g/mol and a heat of fusion between about 10 J/g to about 90 J/g. These polymers may also, when subjected to Temperature Rising Elution Fractionation, exhibit a first fraction that is soluble at −15° C. in ortho-dichlorobenzene and a second fraction that is insoluble or less soluble than the first fraction at −15° C. in ortho-dichlorobenzene. The first fraction may have an isotactic (mm) triad tacticity of about 70 mol % to about 90 mol %, and the second fraction may have an isotactic (mm) triad tacticity of about 85 mol % to about 98 mol %. In preferred embodiments, portions of each polymer of the multi-modal polymer blend are represented in each fraction.

Methods of Preparing Polyolefin Adhesive Components and Compositions

Figure 1:
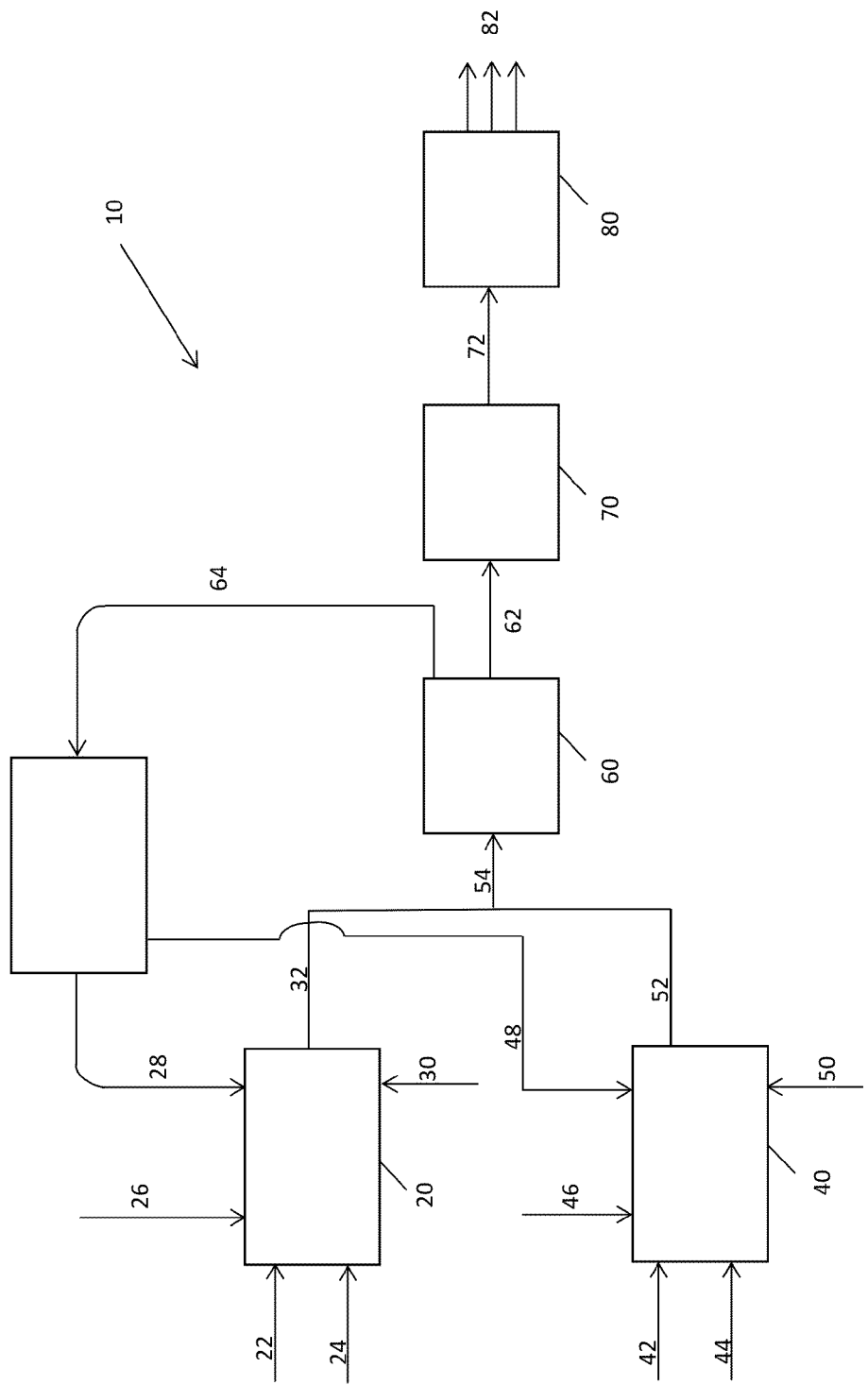
FIG. 1 depicts a generalized process for preparing a polyolefin adhesive component.

A solution polymerization process for preparing a polyolefin adhesive component is generally illustrated in FIG. 1. In an example embodiment, the process is performed by a system 10 that includes a first reactor 20, a second reactor 40 in parallel with the first reactor 20, a liquid-phase separator 60, a devolatilizing vessel 70, and a pelletizer 80. The first reactor 20 and second reactor 40 may be, for example, continuous stirred-tank reactors.

The first reactor 20 may receive a first monomer feed 22 of a first monomer, a second monomer feed 24 of a second monomer, and a catalyst feed 26 of a first catalyst. The first reactor 20 may also receive feeds of a solvent and an activator. The solvent and/or the activator feed may be combined with any of the first monomer feed 22, the second monomer feed 24, or catalyst feed 26 or the solvent and activator may be supplied to the reactor in separate feed streams 28, 30. A first polymer is produced in the first reactor 20 and is evacuated from the first reactor 20 via a first product stream 32. The first product stream 32 comprises the first polymer, solvent, and any unreacted monomer.

In any embodiment, the first monomer may be propylene and the second monomer may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final multi-modal polymer blend. For adhesive compositions, ethylene and hexene are particularly preferred comonomers for copolymerization with propylene. In any embodiment, the relative amounts of propylene and comonomer supplied to the first reactor 20 may be designed to produce a polymer that is predominantly propylene, i.e., a polymer that is more than 50 mol % propylene. In another embodiment, the first reactor 20 may produce a homopolymer of propylene.

The second reactor 40 may receive a third monomer feed 42 of a third monomer, a fourth monomer feed 44 of a fourth monomer, and a catalyst feed 46 of a second catalyst. The second reactor 40 may also receive feeds of a solvent and activator. The solvent and/or the activator feed may be combined with any of the third monomer feed 42, the fourth monomer feed 44, or second catalyst feed 46, or the solvent and activator may be supplied to the reactor in separate feed streams 48, 50. A second polymer is produced in the second reactor 40 and is evacuated from the second reactor 40 via a second product stream 52. The second product stream 52 comprises the second polymer, solvent, and any unreacted monomer.

In any embodiment, the third monomer may be propylene and the fourth monomer may be ethylene or a $C_4$ to $C_{10}$ olefin. In any embodiment, the fourth monomer may be ethylene, butene, hexene, and octene. In any embodiment, the relative amounts of propylene and comonomer supplied to the second reactor 40 may be designed to produce a polymer that is predominantly propylene, i.e., a polymer that is more than 50 mol % propylene. In another embodiment, the second reactor 40 may produce a homopolymer of propylene.

Preferably, the second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer. Specific examples of the types of polymers that may be combined to produce advantageous multi-modal blends are described in greater detail herein.

Although not illustrated in FIG. 1, it should be appreciated that any number of additional reactors may be employed to produce other polymers that may be integrated with (e.g., grafted) or blended with the first and second polymers. In any embodiment, a third reactor may produce a third polymer. The third reactor may be in parallel with the first reactor 20 and second reactor 40 or the third reactor may be in series with one of the first reactor 20 and second reactor 40.

Further description of exemplary methods for polymerizing the polymers described herein may be found in U.S. Pat. No. 6,881,800, which is incorporated by reference herein.

The first product stream 32 and second product stream 52 may be combined to produce a multi-modal blend stream 54. For example, the first product stream 32 and second product stream 52 may supply the first and second polymer to a mixing vessel, such as a mixing tank with an agitator.

The multi-modal blend stream 54 may be fed to a liquid-phase separation vessel 60 to produce a polymer rich phase and a polymer lean phase. The polymer lean phase may comprise the solvent and be substantially free of polymer. At least a portion of the polymer lean phase may be evacuated from the liquid-phase separation vessel 60 via a solvent recirculation stream 64. The solvent recirculation stream 64 may further include unreacted monomer. At least a portion of the polymer rich phase may be evacuated from the liquid-phase separation vessel 60 via a polymer rich stream 62.

In any embodiment, the liquid-phase separation vessel 60 may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel 60.

Figure 3:
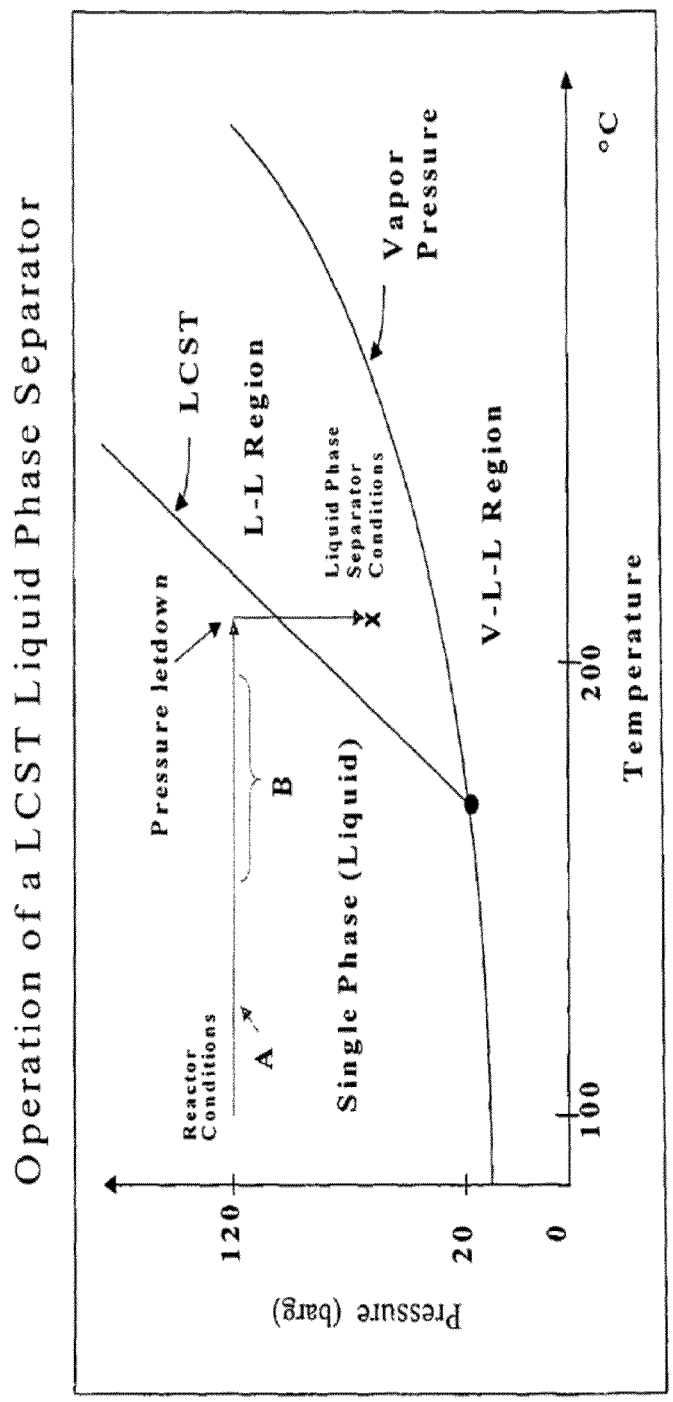
FIG. 3 is a phase diagram illustrating the operation of a liquid phase separator that may be used in processes and systems according to one or more embodiments of the present invention.

Liquid phase separation may be achieved by passing the multi-modal blend stream through a LCST boundary as illustrated in FIG. 3. In this illustrative example, polymerization takes place at 100 or 120 bar in the polymerization reactor(s) at the pressure also prevailing upstream of the pressure let-down device at a level as shown by line A. The temperature is maintained and/or raised to a range marked by the bracket shown at B to between 150° C. and 200° C. or 220° C. At the prevailing temperature, the pressure is dropped along the arrow to a level marked X. As the temperature is reduced across the let-down valve from 100 bar to 40 bar, the polymerization mixture passes from a homogeneous single phase, through the lower critical solution temperature boundary marked LCST, to a two-phase (L-L) region. That is, for a given temperature, the pressure starts at a pressure above the highest of the pressure-temperature curves representing the Upper Critical Solution Temperature (UCST), the LCST, and the vapor pressure, and the pressure after the let-down for the given temperature is below the pressure-temperature curve representing the spinodal boundary and above the pressure-temperature curve representing the vapor pressure. The pressure drop is sufficiently fast to avoid formation of a continuous polymer and to form a discontinuous solvent/monomer phase. The pressure drop across the region bounded by the LCST (binodal) boundary and the spinodal boundary may be especially rapid to induce phase separation by spinodal decomposition, which leads to rapid phase separation and settling.

Level X is above another phase boundary marked Vapor pressure below which the mixture enters a V-L-L region in which it is part vapor, and part two phase liquid. The pressure at level X at the exit of the separator is sufficiently high so that no vapor is formed.

Past experimental measurements have shown that while the concentration of polymer in the lean phase is a function of product family, ranging from about 300 wppm for high molecular weight propylene-ethylene elastomers (i.e., propylene-ethylene elastomers having a weight average molecular weight in the range of 100 k-300 k g/mol) to about 1000 wppm for ethylene propylene diene monomer rubber ("EPDM") and plastomers, the molecular weight of the polymer fraction in the lean phase measured by gel permeation chromatography has generally been less than 10,000 g/mol. See, e.g., U.S. Pat. No. 7,163,989. It was therefore expected that liquid-phase separation of lower molecular weight polymers, such as polymers having a weight average molecular weight in the range of 5,000 g/mol to 100,000 g/mol, would result in a lean phase polymer concentration that was substantially higher than that of the higher molecular weight propylene-ethylene elastomers, EPDM, and plastomers. Such a result would have been even more undesirable for the processing of multi-modal polymer blends in embodiments in which one of the polymers has a significantly lower weight average molecular weight than the other polymer or polymers. Surprisingly, as documented in Example One and Example Two, it was discovered that this was not the case.

It has therefore been determined that employing a liquid-phase separation vessel 60 that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. It was also found that the concentration of polymer in the polymer lean phase may be further reduced by catalyst selection. Catalysts of Formula I (described in the Catalysts and Activators section of this disclosure), particularly dimethylsilyl bis(2-methyl-4-phenylindenyl) zirconium dichloride, dimethylsilyl bis(2-methyl-5-phenylindenyl) hafnium dichloride, dimethylsilyl bis (2-methyl-4-phenylindenyl) zirconium dimethyl, and dimethylsilyl bis(2-methyl-4-phenylindenyl) hafnium dimethyl were found to be a particularly effective catalysts for minimizing the concentration of polymer in the lean phase. Accordingly, in any embodiment, one, both, or all polymers may be produced using a catalyst of Formula I, particularly dimethylsilyl bis(2-methyl-4-phenylindenyl) zirconium dichloride, dimethylsilyl bis(2-methyl-4-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

Referring back to FIG. 1, upon exiting the liquid-phase separation vessel 60, the polymer rich stream 62 may then be fed to a devolatilizing vessel 70 for further polymer recovery. In any embodiment, the polymer rich stream 62 may also be fed to a low pressure separator before being fed to the inlet of the devolatilizing vessel 70. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream 72.

The devolatilizing vessel 70 may be a devolatilizing device that is known in the art. Any such device capable of removing solvent from a polymer melt to achieve the evaporative cooling described herein may be used. Certain of those devices are described in more detail below.

In any embodiment, the devolatilizing vessel may include a vacuum chamber having an inlet for receiving a polymer melt, an outlet for discharging a polymer melt, a vacuum port through which volatiles may be removed, and a stirrer shaft port for the entry of a stirrer shaft. The stirrer shaft may pass through at least one stirrer shaft port, extend into the vacuum chamber and carry an agitation means, such as one or more: conventional circular or elliptical paddles, conventional blades, conventional rods, or combinations thereof. The agitation means include any conventional agitation apparatus known to those skilled in the art. The devolatilizer may include a motor located outside of the vacuum chamber for rotating shaft.

The devolatilizer may also comprise a screw shaft associated with the outlet from the vacuum chamber for driving the polymer through the outlet. In that case the vacuum chamber will also have a screw shaft port through which the screw shaft passes into the chamber, and that screw shaft port will also include a screw shaft seal having an external portion outside of the vacuum chamber. Preferably, the devolatilizer also comprises means, such as an enclosure supplied with a low oxygen content gas, for blanketing the external portion of the screw shaft seal with the low oxygen content gas.

Typically, the vacuum chamber is generally cylindrical and is horizontal such that the axis of the cylinder lies in a horizontal plane, and the stirrer shaft also extends horizontally and optionally coincides with axis of the cylinder.

The provided apparatus and process use any suitable low oxygen content gas. Preferably, the low oxygen content gas has less than 3 wt % oxygen, preferably less than 0.5 wt % oxygen. More preferably, the low oxygen content gas is substantially free or completely free (0.0 wt %) of oxygen. Low oxygen content gases include conventional gases that do not contain oxygen, such as helium, argon, nitrogen, steam, carbon dioxide, or combinations thereof. Preferably, the low oxygen content gas is nitrogen.

Optionally, the internal volume of the vacuum chamber is at least 2 $m^3$, for example, at least 4 $m^3$ and is optionally at most 15 $m^3$, for example 11 $m^3$. Optionally, the vacuum chamber is generally cylindrical with a length of at least 4 m, optionally at least 6 m, and a diameter of at least 1 m.

Typically, the vacuum devolatilizer comprises or is connected to at least one pump for applying a vacuum to the vacuum chamber via the vacuum port or vacuum ports.

Figure 2:
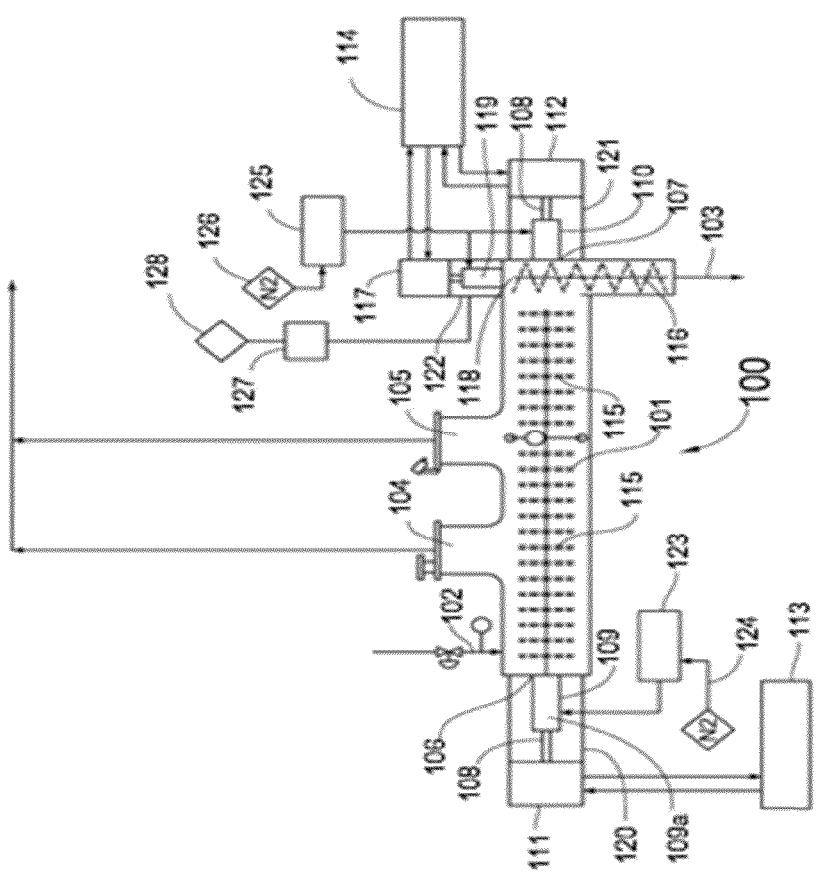
FIG. 2 depicts a generalized devolatilizing device suitable for use in the inventive processes and systems.

FIG. 2 shows the arrangement of an exemplary devolatilizer 100 suitable for use in the inventive processes and systems. The devolatilizer 100 includes a vacuum chamber 101 which is provided with an inlet 102 for a polymer composition comprising polymer and solvent, an outlet 103 for polymer flowing to a pelletizer and two vacuum ports 104 and 105 which are connected via conduits to a vacuum system comprising a pump. The vacuum chamber 101 is generally cylindrical and may have a length of approximately 2 to 10 meters and a diameter of over 1 meter. The vacuum chamber 101 is horizontally mounted and is provided at each end with a stirrer shaft port 106, 107. Stirrer shaft 108 extends horizontally through the stirrer shaft ports 106, 107 and is coaxial with the axis of the cylindrical vacuum chamber 101. Stirrer shaft port 106 is provided with a stirrer shaft seal 109 for sealing between the vacuum chamber 101 and the stirrer shaft 108. Stirrer shaft port 107 is provided with a similar stirrer shaft seal 110. The function of stirrer shaft seals 109 and 110 is to prevent ingress of the atmosphere external to the vacuum chamber 101 into the interior vacuum chamber 101. The vacuum devolatilizer 100 further includes two hydraulic motors 111, 112 mounted at the ends of the stirrer shaft 108 for driving the stirrer shaft 108. Those motors 111, 112 are powered by separate hydraulic drives 113 and 114, respectively. A number of paddles 115 are provided along the length of stirrer shaft 108 for agitating the polymer inside the vacuum chamber 101.

At the end of the vacuum chamber 101 remote from the inlet 102 a horizontally mounted screw shaft 116 is mounted orthogonal to the stirrer shaft 108 (in FIG. 2 the screw shaft appears in a vertical direction for clarity). Screw shaft 116 is driven by hydraulic motor 117, which is powered by hydraulic drive 114. The function of screw shaft 116 is to drive polymer out of the vacuum chamber 101 and through the outlet 103 towards the downstream pelletizer. The screw shaft 116 enters the vacuum chamber through a screw shaft port 118, which is provided with a screw shaft seal 119.

Seal 109 has a portion 109a that extends outside the vacuum chamber 101. The external portion 109a of the seal 109 is contained within enclosure 120, which is a cylindrical enclosure extending from the end of the vacuum chamber 101 to the housing of the motor 111. When the devolatilizer 100 is in operation, the enclosure 120 is supplied with nitrogen from a nitrogen source to maintain an inert atmosphere within the enclosure 120, thereby blanketing the external portion 109a of the seal 109 with the inert atmosphere. In that way, any leak in seal 109 draws nitrogen from the interior enclosure 120 into the interior of the vacuum chamber 101 rather than air from the atmosphere. The nitrogen supply to enclosure 120 may be monitored by a monitor so that any sudden rises of nitrogen flow out of the enclosure 120 will be detected as an indication of a possible leak in the seal 109. In a similar way, stirrer shaft seal 110 has a portion that extends external to the vacuum chamber 101, which is enclosed inside nitrogen-filled enclosure 121, and the screw shaft seal 119 has a portion that extends external to the vacuum chamber 101 that is enclosed inside nitrogen-filled enclosure 122. Enclosures 121 and 122 may each have its own independent supply of nitrogen, each with its own independent monitor for detecting any increase in the flow of nitrogen to the enclosure.

As can be seen from FIG. 2, each of the motors 111, 112, and 117 has a housing that forms part of the enclosures 120, 121, and 122, respectively.

Seal 109 is provided with a dedicated oil injection pump 123 that feeds lubricant oil into the seal 109, thereby improving the sealing action and extending the lifetime of the seal packing. Pump 123 is an air driven plunger pump which meters an exact quantity of oil to the seal for each stroke thereby ensuring that excessive oil is not injected into the seal. Oil flow is carefully controlled to limit the ingress of seal oil into the polymer. Alternately, the oil may be pressurized with nitrogen supply 124 that applies a pressure to a reservoir of lubricant oil thereby forcing the oil at a specified pressure into the seal 109.

In a similar way seal 110 is provided with an oil pump 125 and an associated air supply or nitrogen supply 126, and seal 119 is provided with an oil pump 127 having an associated nitrogen supply 128.

During operation of the devolatilizer 100 a polymer composition comprising a semi-crystalline polymer and a solvent flows into inlet 102 of vacuum chamber 101. Inside the vacuum chamber, the polymer composition is agitated by the paddles 115 fixed to stirrer shaft 108, which may rotate at a speed of, for example, between 20 and 45 rpm. The agitation continuously exposes new surface of the polymer inside the vacuum chamber 101 and volatile solvent material is drawn off through the two vacuum ports 104, 105 toward the vacuum system, the vacuum is maintained inside the vacuum chamber 101 at a pressure of approximately 20 mmHg The polymer flows along the length of the vacuum chamber 101 and is driven out of the end of vacuum chamber 101 by rotating screw shaft 116 through outlet 103 towards the downstream pelletizer 200.

Further embodiments and a more detailed description of the operation of devolatilizing devices suitable for use herein may be found in U.S. patent Ser. No. 12/972,140, which is incorporated by reference herein in its entirety. Suitable devolatilizing devices are available commercially from, for example, LIST USA, Inc.

Referring back to FIG. 1, the cooled discharge stream 72 may then be fed to a pelletizer 80 where the multi-modal polymer blend is then discharged through a pelletization die as formed pellets 82. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art. Examples of useful underwater pelletizing devices can be found in U.S. Pat. Nos. 7,033,152; 7,226,553 and 7,470,118, all of which are incorporated herein by reference.

In any embodiment, an underwater pelletizer may be used to pelletize the cooled polymer. In such embodiments, the polymer may be extruded through a pelletizing die to form strands, and the strands may then be cut by rotating cutter blades in the water box of the underwater pelletizer. Water may continuously flow through the water box to further cool and solidify the pellets and carry the pellets out of the underwater pelletizer's water box for further processing. In any embodiment, the temperature of the water in the underwater pelletizing unit may be from about 0° C. to 25° C. Preferably a water chilling system cools the water going to the underwater pelletizer water box (cutting chamber) to about 5° C.

In any embodiment, the pelletizing die may be thermally regulated by means known to those skilled in the art in order to prevent die hole freeze-off.

In any embodiment, the underwater pelletizer unit may have a chilled water slurry circulation loop. The chilled water helps eliminate the tendency of the pellets to stick together and allows the extruded polymer strands to be more cleanly cut. The chilled water slurry circulation loop may be fluidly connected with the water box of the underwater pelletizer, and may carry the pellet-water slurry to a pellet drying unit, and then recycle the water back to the underwater pelletizer. In any embodiment, the residence time of the pellets in the chilled water slurry circulation loop may be at least 10 seconds, or at least 20 seconds, or at least 30 seconds, or at least 40 seconds, or at least 50 seconds or more. Because fresh pellets may have a tendency to bridge and agglomerate if the pellets have not had adequate time to crystallize and harden, it is preferred that the pellets have sufficient residence time in the pellet water loop to harden.

In the same or other embodiments, chilled water may be used to remove the pellets from the cutter blade and transports them through a screen that catches and removes coarsely aggregated or agglomerated pellets. The water may then transport the pellets through a dewatering device and into a centrifugal dryer or fluidized bed to remove excess surface moisture from the pellets. The pellets may then pass through a discharge chute for collection or may proceed to additional processing.

The pelletizing die can be used to make pellets in various shapes including, but not limited to, spheres, rods, slats, or polygons. Preferably, near spherical pellets are made. A pellet shape that will allow the pellets to easily flow is preferred.

The speed at which the pelletizer operates is selected according to the die plate size, number of orifices in the die, and the desired pellet size and shape. The number of orifices in the die and the orifice geometry are selected as appropriate for the polymer feed flow rate and melt material and such determinations are within the knowledge and capabilities of those skilled in the art.

Incomplete crystallization of the polymer material in the pellets after the pellets have exited the pellet-water slurry loop can lead to poor pellet geometry, pellet deformation, and reduced ability of the pellets to freely flow. The degree of crystallization of the pellets is affected by residence time and temperature of the pellets. Additionally, the pellet hardness varies with residence time and temperature.

Optionally, an antiblocking agent may be added to the water in the underwater pelletizing water box or chilled water slurry loop. The addition of an antiblocking agent to the pellet water loop is useful to prevent pellets from sticking together in the loop.

A. Monomers

Polymers produced by any of the methods of the invention and/or employed in any of the compositions of the invention are preferably derived from one or more monomers selected from the group consisting of propylene, ethylene, $C_4$ to $C_{20}$ linear or branched olefins, and diolefins (particularly, $C_4$ to $C_{10}$ olefins). The term "monomer" or "comonomer" as used herein can refer to the monomer used to form the polymer, i.e., the unreacted chemical compound in the form prior to polymerization, and can also refer to the monomer after it has been incorporated into the polymer, also referred to herein as a "[monomer]-derived unit", which by virtue of the polymerization reaction typically has fewer hydrogen atoms than it does prior to the polymerization reaction.

Preferably, the polymer is predominantly propylene. Preferred comonomers include ethylene, butene, hexene, and octene, with ethylene being the most preferred comonomer. For propylene-based polymers, the crystallinity and heat of fusion of the polymer are affected by the comonomer content and the sequence distribution of the comonomer within the polymer. Generally, increased levels of comonomer will reduce the crystallinity provided by the crystallization of stereoregular propylene-derived sequences.

The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis.

Various test methods including GPC measurements methods and methods for determining ethylene content by NMR and the DSC measurements are described in U.S. Pat. No. 6,525,157, which is incorporated by reference herein in its entirety.

B. Catalysts and Activators

The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

The polymers described herein may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Any given transition metal compound or catalyst precursor can yield a catalytically active component (catalyst) with various activators, affording a wide array of catalysts deployable in the processes of the present invention. Catalyst systems of the present invention comprise at least one transition metal compound and at least one activator. However, catalyst systems of the current disclosure may also comprise more than one transition metal compound in combination with one or more activators. Such catalyst systems may optionally include impurity scavengers. Each of these components is described in further detail below.

In any embodiment, the catalyst systems used for producing semi-crystalline polymers may comprise a metallocene compound. In any embodiment, the metallocene compound may be a bridged bisindenyl metallocene having the general formula $(In^1)Y(In^2)MX_2$, where $In^1$ and $In^2$ are identical substituted or unsubstituted indenyl groups bound to M and bridged by Y, Y is a bridging group in which the number of atoms in the direct chain connecting $In^1$ with $In^2$ is from 1 to 8 and the direct chain comprises C, Si, or Ge; M is a Group 3, 4, 5, or 6 transition metal; and $X_2$ are leaving groups. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, μ-dimethylsilylbis(indenyl) hafnium dimethyl and μ-dimethylsilylbis(indenyl) zirconium dimethyl.

In any embodiment, the metallocene compound may be a bridged bisindenyl metallocene having the general formula ($In^1$)Y($In^2$)$MX_2$, where $In^1$ and $In^2$ are identical 2,4-substituted indenyl groups bound to M and bridged by Y, Y is a bridging group in which the number of atoms in the direct chain connecting $In^1$ with $In^2$ is from 1 to 8 and the direct chain comprises C, Si, or Ge, M is a Group 3, 4, 5, or 6 transition metal, and $X_2$ are leaving groups. $In^1$ and $In^2$ are substituted in the 2 position by a $C_1$ to $C_{10}$ alkyl, preferably a methyl group and in the 4 position by a substituent selected from the group consisting of $C_5$ to $C_{15}$ aryl, $C_6$ to $C_{25}$ alkylaryl, and Si-, N- or P-containing alkyl or aryl. Each leaving group X may be an alkyl, preferably methyl, or a halide ion, preferably chloride or fluoride. Exemplary metallocene compounds of this type include, but are not limited to, (dimethylsilyl)bis(2-methyl-4-(3,'5'-di-tert-butylphenyl)indenyl) zirconium dimethyl, (dimethylsilyl)bis(2-methyl-4-(3,'5'-di-tert-butylphenyl)indenyl) hafnium dimethyl, (dimethylsilyl)bis(2-methyl-4-naphthylindenyl) zirconium dimethyl, (dimethylsilyl)bis(2-methyl-4-naphthylindenyl) hafnium dimethyl, (dimethylsilyl)bis(2-methyl-4-(N-carbazyl)indenyl) zirconium dimethyl, and (dimethylsilyl)bis(2-methyl-4-(N-carbazyl)indenyl) hafnium dimethyl.

Alternatively, in any embodiment, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl) hafnium dimethyl, diphenylsilyl bis(5,5,8,8-tetramethyl-5,6,7,8-tetrahydrobenz(f)indenyl) hafnium dimethyl, diphenylsilyl bis(2-(methyl)-5,5,8,8-tetramethyl-5,6,7,8-tetrahydrobenz(f)indenyl) zirconium dichloride, and cyclo-propylsilyl bis(2-(methyl)-5,5,8,8-tetramethyl-5,6,7,8-tetrahydrobenz(f)indenyl) hafnium dimethyl.

In any embodiment, the activators of the catalyst systems used to produce semi-crystalline polymers may comprise a cationic component. In any embodiment, the cationic component may have the formula $[R^1R^2R^3AH]^+$, where A is nitrogen, $R^1$ and $R^2$ are together a —$(CH_2)_a$-group, where a is 3, 4, 5, or 6 and form, together with the nitrogen atom, a 4-, 5-, 6-, or 7-membered non-aromatic ring to which, via adjacent ring carbon atoms, optionally one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. Alternatively, in any embodiment, the cationic component has the formula $[R_nAH_{4-n}]^+$, where A is nitrogen, n is 2 or 3, and all R are identical and are $C_1$ to $C_3$ alkyl groups, such as for example trimethylammonium, trimethylanilinium, triethylammonium, dimethylanilinium, or dimethylammonium.

A particularly advantageous catalyst that may be employed in any embodiment is illustrated in Formula I.

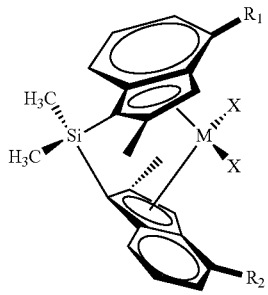

Formula I

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula I are dimethylsilyl bis(2-methyl-4-phenylindenyl) zirconium dichloride, dimethylsilyl bis(2-methyl-4-phenylindenyl) zirconium dimethyl, dimethylsilyl bis(2-methyl-4-phenylindenyl) hafnium dichloride, and dimethylsilyl bis(2-methyl-4-phenylindenyl) hafnium dimethyl.

Another advantageous catalyst that may be employed in any embodiment is illustrated in Formula II.

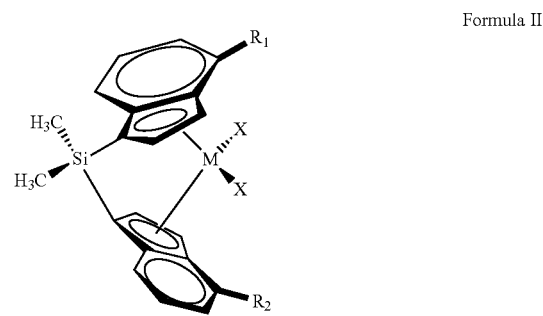

Formula II

In any embodiment, M is a Group IV transition metal atom, preferably a Group IVB transition metal, more preferably hafnium or zirconium, and X are each an alkyl, preferably methyl, or a halide ion, preferably chloride or fluoride. Methyl or chloride leaving groups are most preferred. In any embodiment, R1 and R2 may be independently selected from the group consisting of hydrogen, phenyl, and naphthyl. R1 is preferably the same as R2. Particularly advantageous species of Formula II are dimethylsilylbis(indenyl) hafnium dimethyl, dimethylsilylbis(indenyl) hafnium dichloride, dimethylsilylbis(indenyl) zirconium dimethyl, and dimethylsilylbis(indenyl) zirconium dichloride.

In any embodiment, one or more of the polymers may also be produced using the catalyst illustrated in Formula III.

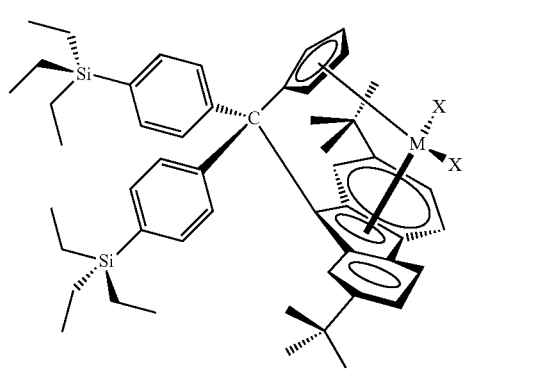

Formula III

In any embodiment, M is a Group IV transition metal atom, preferably a Group IV transition metal, more preferably hafnium or zirconium, and X are each an alkyl, preferably methyl, or a halide ion, preferably chloride or fluoride.

Methyl or chloride leaving groups are most preferred. Particularly advantageous species of Formula III are 1,1'-bis(4-triethylsilylphenyl)methylene-(cyclopentadienyl)(2,7-di-tertiary-butyl-9-fluorenyl)hafnium dimethyl; 1,1'-bis(4-triethylsilylphenyl)methylene-(cyclopentadienyl)(2,7-di-tertiary-butyl-9-fluorenyl)hafnium dichloride; 1,1'-bis(4-triethylsilylphenyl)methylene-(cyclopentadienyl)(2,7-di-tertiary-butyl-9-fluorenyl)zirconium dimethyl; and 1,1'-bis (4-triethylsilylphenyl)methylene-(cyclopentadienyl)(2,7-di-tertiary-butyl-9-fluorenyl)zirconium dichloride.

Any catalyst system resulting from any combination of a metallocene compound, a cationic activator component, and an anionic activator component mentioned in this disclosure shall be considered to be explicitly disclosed herein and may be used in accordance with the present invention in the polymerization of one or more olefin monomers. Also, combinations of two different activators can be used with the same or different metallocene(s).

In any embodiment, the activators of the catalyst systems used to produce the semi-crystalline polymers may comprise an anionic component, $[Y]^-$. In any embodiment, the anionic component may be a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. The substituents may be perhalogenated aryl groups, or perfluorinated aryl groups, including, but not limited to, perfluorophenyl, perfluoronaphthyl and perfluorobiphenyl.

Together, the cationic and anionic components of the catalysts systems described herein form an activator compound. In any embodiment, the activator may be N,N-dimethylanilinium-tetra(perfluorophenyl)borate, N,N-dimethylanilinium-tetra(perfluoronaphthyl)borate, N,N-dimethylanilinium-tetrakis(perfluorobiphenyl)borate, N,N-dimethylanilinium-tetrakis(3,5-bis(trifluoromethyl)phenyl) borate, triphenylcarbenium-tetra(perfluorophenyl)borate, triphenylcarbenium-tetra(perfluoronaphthyl)borate, triphenylcarbenium-tetrakis(perfluorobiphenyl)borate, or triphenylcarbenium-tetrakis(3,5-bis(trifluoromethyl)phenyl)borate.

A non-coordinating anion activator may be employed with the catalysts of Formula I, Formula II, and Formula III. A particularly advantageous activator is dimethylaniliniumtetrakis(heptafluoronaphthyl)borate.

Suitable activators for the processes of the present invention also include aluminoxanes (or alumoxanes) and aluminum alkyls. Without being bound by theory, an alumoxane is typically believed to be an oligomeric aluminum compound represented by the general formula $(R^x-Al-O)_n$, which is a cyclic compound, or $R^x(R^x-Al-O)_n AlR^x_2$, which is a linear compound. Most commonly, alumoxane is believed to be a mixture of the cyclic and linear compounds. In the general alumoxane formula, $R^x$ is independently a $C_1$-$C_{20}$ alkyl radical, for example, methyl, ethyl, propyl, butyl, pentyl, isomers thereof, and the like, and n is an integer from 1-50. In any embodiment, $R^x$ may be methyl and n may be at least 4. Methyl alumoxane (MAO), as well as modified MAO containing some higher alkyl groups to improve solubility, ethyl alumoxane, iso-butyl alumoxane, and the like are useful for the processes disclosed herein.

Further, the catalyst systems suitable for use in the present invention may contain, in addition to the transition metal compound and the activator described above, additional activators (co-activators), and/or scavengers. A co-activator is a compound capable of reacting with the transition metal complex, such that when used in combination with an activator, an active catalyst is formed. Co-activators include alumoxanes and aluminum alkyls.

In any embodiment, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$), and the like. Exemplary aluminum alkyls include triethylaluminum, diethylaluminum chloride, ethylaluminium dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

C. Solvents

The solvent used in the reaction system of the present invention may be any non-polymeric species capable of being removed from the polymer composition by heating to a temperature below the decomposition temperature of the polymer and/or reducing the pressure of the solvent/polymer mixture. In any embodiment, the solvent may be an aliphatic or aromatic hydrocarbon fluid.

Examples of suitable, preferably inert, hydrocarbon fluids are readily volatile liquid hydrocarbons, which include, for example, hydrocarbons containing from 1 to 30, preferably 3 to 20, carbon atoms. Preferred examples include propane, n-butane, isobutane, mixed butanes, n-pentane, isopentane, neopentane, n-hexane, cyclohexane, isohexane, octane, other saturated $C_6$ to $C_8$ hydrocarbons, toluene, benzene, ethylbenzene, chlorobenzene, xylene, desulphurized light virgin naphtha, and any other hydrocarbon solvent recognized by those skilled in the art to be suitable for the purposes of this invention. Particularly preferred solvents for use in the processes disclosed herein are n-hexane and toluene.

The optimal amount of solvent present in combination with the polymer at the inlet to the devolatilizer will generally be dependent upon the desired temperature change of the polymer melt within the devolatilizer, and can be readily determined by persons of skill in the art. For example, the polymer composition may comprise, at the inlet of the devolatilizer, from about 1 wt % to about 50 wt % solvent, or from about 5 wt % to about 45 wt % solvent, or from about 10 wt % to about 40 wt % solvent, or from about 10 wt % to about 35 wt % solvent.

D. Polymers

The polymers that may be manufactured in the methods disclosed herein generally include any of the polymers formed of the monomers disclosed herein. Preferred polymers are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries.

"Propylene-based" or "predominantly propylene-based" as used herein, is meant to include any polymer comprising propylene, either alone or in combination with one or more comonomers, in which propylene is the major component (i.e., greater than 50 mol % propylene).

In any embodiment, one or more polymers of the blend may comprise one or more propylene-based polymers, which comprise propylene and from about 5 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more polymers of the blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mol is based upon the total mol of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers may include up to about 95 mol %, or up to about 94 mol %, or up to about 93 mol %, or up to about 92 mol %, or up to about 90 mol %, or up to about 88 mol % propylene-derived units, where the percentage by mol is based upon the total mol of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 125° C., or less than about 120° C., or less than about 115° C., or less than about 110° C., or less than about 100° C., or less than about 90° C. In any embodiment, the Tm of the one or more polymers of the blend may be greater than about 25° C., or greater than about 30° C., or greater than about 35° C., or greater than about 40° C.

In one or more embodiments, the first crystallization temperature (Tc1) of the polymer (as determined by viscosity curve) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc1 of the polymer is greater than about 0° C., or greater than about 5° C., or greater than about 10° C., or greater than about 15° C., or greater than about 20° C. In any embodiment, the Tc1 lower limit of the polymer may be 0° C., 5° C., 10° C., 20° C., 30° C., 40° C., 50° C., 60° C., and 70° C.; and the Tc1 upper limit temperature may be 100° C., 90° C., 80° C., 70° C., 60° C., 50° C., 40° C., 30° C., 25° C., and 20° C. with ranges from any lower limit to any upper limit being contemplated.

In one or more embodiments, the second crystallization temperature (Tc2) of the polymer (as determined by DSC) is less than about 100° C., or less than about 90° C., or less than about 80° C., or less than about 70° C., or less than about 60° C., or less than about 50° C., or less than about 40° C., or less than about 30° C., or less than about 20° C., or less than about 10° C. In the same or other embodiments, the Tc2 of the polymer is greater than about 0° C., or greater than about 5° C., or greater than about 10° C., or greater than about 15° C., or greater than about 20° C. In any embodiment, the Tc2 lower limit of the polymer may be 0° C., 5° C., 10° C., 20° C., 30° C., 40° C., 50° C., 60° C., and 70° C.; and the Tc2 upper limit temperature may be 100° C., 90° C., 80° C., 70° C., 60° C., 50° C., 40° C., 30° C., 25° C., and 20° C. with ranges from any lower limit to any upper limit being contemplated.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing. Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotatic polypropylene.

The semi-crystalline polymer can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 mol % to about 97 mol %. Triad tacticity is determined by the methods described in U.S. Patent Application Publication No. 2004/0236042.

The semi-crystalline polymer may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in 17 MACROMOLECULES, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature as measured per the ASTM D-792 test method.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001.

Solvent for the SEC experiment is prepared by dissolving 6 g of butylated hydroxy toluene as an antioxidant in 4 L of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranged from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules $$x_i = N_i / \Sigma N_i$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \Sigma c_i)^{1/\alpha}$$

In one or more embodiments, the semi-crystalline polymer may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

In one or more embodiments, the semi-crystalline polymer may be characterized by its viscosity at 190° C. In one or more embodiments, the semi-crystalline polymer may have a viscosity that is at least about 100 cP (centipoise), or at least about 500 cP, or at least about 1,000 cP, or at least about 1,500 cP, or at least about 2,000 cP, or at least about 3,000 cP, or at least about 4,000 cP, or at least about 5,000 cP. In these or other embodiments, the semi-crystalline polymer may be characterized by a viscosity at 190° C. of less than about 100,000 cP, or less than about 75,000 cP, or less than about 50,000 cP, or less than about 25,000 cP, or less than about 20,000 cP, or less than about 15,000 cP, or less than about 10,000 cP, or less than about 5,000 cP with ranges from any lower limit to any upper limit being contemplated.

E. Multi-Modal Polymer Blends

In any embodiment, one or more of the polymers described herein may be blended with another polymer, such as another polymer described herein, to produce a physical blend of polymers, preferably a multi-modal polymer blend. The term "blend" as used herein refers to a mixture of two or more polymers. The term "multi-modal" as used herein refers to a blend of two or more distinct polymer species in which each species is distinguishable from another species present in the blend on the basis of at least one chemical or physical property such as molecular weight, molecular weight distribution, melt viscosity, comonomer content, crystallinity, and combinations thereof.

In any embodiment, the multi-modal polymer blend may include a first propylene-based polymer and a second propylene-based polymer. The first and second propylene-based polymers, independently, may be a homopolymer of propylene or a copolymer of propylene and ethylene or a $C_4$ to $C_{10}$ alpha-olefin. In any embodiment, the second propylene-based polymer may be compositionally different than the first propylene-based polymer. The term "compositionally different" as used herein refers to a difference in crystallinity, tacticity, comonomer content, heat of fusion, molecular weight, molecular weight distribution, melt viscosity, or a combination thereof between two polymers. Preferably, the two polymers have a difference in crystallinity, tacticity, comonomer content, heat of fusion, or a combination thereof. In any embodiment, the multi-modal polymer blend may have a Mw of about 10,000 g/mol to about 150,000 g/mol, and a heat of fusion between about 10 J/g to about 90 J/g.

By employing the processes disclosed herein, multi-modal polymer blends may be engineered to exhibit high levels of isotactic (mm) triad tacticity in a first low-crystalline portion and a second higher-crystalline portion. In particular, multi-modal polymer blends may be engineered that have, when subjected to Temperature Rising Elution Fractionation, a first fraction that is soluble at −15° C. in ortho-dichlorobenzene, the first fraction having an isotactic (mm) triad tacticity of about 70 mol % to about 90 mol %; and a second fraction that is insoluble or less soluble than the first fraction at −15° C. in ortho-dichlorobenzene, the second fraction having an isotactic (mm) triad tacticity of about 85 mol % to about 98 mol %.

Advantageously, the multi-modal polymer blend may be engineered such that the fraction that is soluble at −15° C. in ortho-dichlorobenzene comprises portions of each polymer of the multi-modal polymer blend. In addition, the fraction that is less soluble or insoluble at −15° C. in ortho-dichlorobenzene may comprise portions of each polymer of the multi-modal polymer blend. Without being bound by theory, it is believed that adhesion and flexibility of the finished adhesive is improved when both polymers of the multi-modal polymer blend have portions that exhibit characteristics of amorphousness. Without being bound by theory, it is also believed that set time of the finished adhesive is improved when each polymer of the multi-modal polymer blend has portions that exhibit characteristics of semi-crystallinity.

In any embodiment, the multi-modal polymer blend may be a dual reactor product in which the first predominantly propylene-based polymer is produced in a first reactor and the second predominantly propylene-based polymer is produced in a second reactor that is in parallel to the first reactor. The polymer product from each reactor may then be blended to form an in-solution polymer blend comprising both polymers and a solvent. The in-solution polymer blend may then be finished to remove the solvent and pelletized in the form of a polymer pellet. Preferably, each of the predominantly propylene-based polymers has an isotactic (mm) triad tacticity of about 70 mol % to about 98 mol %. The relative weight percentages of polymers of blend may vary depending on the application of the hot melt adhesive formulation. In any embodiment, the higher crystalline polymer may be about 10% to about 90% of the polymer blend, or about 20% to about 80% of the polymer blend, or about 30% to about 70% of the polymer blend, or about 40% to about 60% of the polymer blend.

F. Blended Multi-Modal Polymer Products

Blended multi-modal polymer products are also provided. In any embodiment, the multi-modal polymer product may be produced by any of the foregoing methods. For example, multi-modal polymer products may be produced using any of the previously described monomers, using any of the described catalyst systems, and/or using any of the previously described polymer blends. In any embodiment, the multi-modal polymer product may be produced by combining product streams of two or more reactors in parallel to form a blended stream, and then pelletizing the blended stream to produce polymeric pellets. In any embodiment, the blended stream may be fed to a liquid-phase separator to remove a portion of solvent from the blended stream prior to pelletizing. In any embodiment, the blended stream may be fed to a devolatilizing device to reduce the temperature of the stream and remove solvent from the blended stream prior to pelletizing.

In any embodiment, the blended multi-modal polymer product may comprise a first polymer, wherein the first polymer is a copolymer of propylene and ethylene or a $C_4$ to $C_{10}$ olefin, and a second polymer in a second reactor in parallel with the first reactor, wherein the second polymer is a copolymer of propylene and ethylene or a $C_4$ to $C_{10}$ olefin, wherein the first polymer and second polymer have a difference in heat of fusion of about 10 J/g or more, or about 20 J/g or more, or about 25 J/g or more. In any embodiment, the difference in heat of fusion between the first polymer and second polymer may be about 30 J/g or more.

In any embodiment, the first polymer may have a heat of fusion of about 60 J/g or more, and the second polymer may have a heat of fusion of about 30 J/g or less. In any embodiment, the first polymer may have a heat of fusion of about 80 J/g or more, and the second polymer may have a heat of fusion of about 50 J/g or less. In any embodiment, the first polymer may have a heat of fusion of about 50 J/g or more, and the second polymer may have a heat of fusion of about 15 J/g or less. In any embodiment, the first polymer may have a heat of fusion of about 65 J/g to about 85 J/g and the second polymer may have a heat of fusion of about 10 J/g to about 20 J/g. In any embodiment, the first polymer may have a heat of fusion of about 30 J/g or more and the second polymer may have a heat of fusion of 20 J/g or less.

In any embodiment, the blended multi-modal polymer product may comprise a plurality of pellets comprising the multi-modal polymer blend. In any embodiment, the pellets may consist essentially of the polymer blend, optionally including stabilizing additives such as antioxidants. In other embodiments, the pellets may also include one or more waxes and/or tackifiers.

In any embodiment, the pellets may be used in a hot melt adhesive application system to produce an adhesive. The adhesive may be applied to and used to bond together various substrates, including but not limited to paper-based packages, polymeric films, cellulosic and polymeric nonwoven materials, book bindings and wood.

III. Specific Embodiments

The invention may also be understood with relation to the following specific embodiments:

Paragraph A: A multi-modal polymer blend for use in an adhesive composition comprising:

a first predominantly propylene-based polymer, wherein the first predominantly propylene-based polymer is a homopolymer of propylene or comprises a comonomer of ethylene or a $C_4$ to $C_{10}$ alpha-olefin;

a second predominantly propylene-based polymer, wherein the second predominantly propylene-based polymer is a homopolymer of propylene or comprises a comonomer of ethylene or a $C_4$ to $C_{10}$ alpha-olefin; wherein the second predominantly propylene-based polymer is different than the first predominantly propylene-based polymer;

wherein the multi-modal polymer blend has a Mw of about 10,000 g/mol to about 150,000 g/mol, and a heat of fusion between about 10 J/g to about 90 J/g; and wherein, when subjected to Temperature Rising Elution Fractionation, the multi-modal polymer blend exhibits:

a first fraction that is soluble at −15° C. in a hydrocarbon solvent, the first fraction having an isotactic (mm) triad tacticity of about 70 mol % to about 90 mol %; and a second fraction that is insoluble or less soluble than the first fraction at −15° C. in the hydrocarbon solvent, the second fraction having an isotactic (mm) triad tacticity of about 85 mol % to about 98 mol %.

Paragraph B: The multi-modal polymer blend of Paragraph A, wherein the first fraction comprises a first portion of the first predominantly propylene-based polymer and a first portion of the second predominantly propylene-based polymer.

Paragraph C: The multi-modal polymer blend of Paragraph A or Paragraph B, wherein the second fraction comprises a second portion of the first predominantly propylene-based polymer and a second portion of the second predominantly propylene-based polymer.

Paragraph D: The multi-modal polymer blend of any of Paragraphs A-C, wherein the first predominantly propylene-based polymer has an isotactic (mm) triad tacticity of about 70 mol % to about 98 mol %.

Paragraph E: The multi-modal polymer blend of any of Paragraphs A-D, wherein the second predominantly propylene-based polymer has an isotactic (mm) triad tacticity of about 70 mol % to about 98 mol %.

Paragraph F: The multi-modal polymer blend of any of Paragraphs A-E, wherein the first fraction accounts for less than 90 weight % of the multi-modal polymer blend.

Paragraph G: The multi-modal polymer blend of any of Paragraphs A-F, wherein the second fraction has an elution temperature of −10° C. to 60° C. and has a Mw/Mn of 2.2 or less.

Paragraph H: The multi-modal polymer blend of any of Paragraphs A-G, further comprising a third fraction having an elution temperature greater than 60° C.

Paragraph I: The multi-modal polymer blend of any of Paragraphs A-H, wherein the multi-modal polymer blend has a Mw of about 10,000 to about 100,000 g/mol.

Paragraph J: The multi-modal polymer blend of any of Paragraphs A-I, wherein the soluble fraction has a Mw/Mn of at least 2.5.

Paragraph K: The multi-modal polymer blend of Paragraph J, wherein the soluble fraction has a Mw/Mn of at least 4.0.

Paragraph L: The multi-modal polymer blend of Paragraph K, wherein the soluble fraction has a Mw/Mn of at least 4.5.

Paragraph M: The multi-modal polymer blend of any of Paragraphs A-L, wherein the soluble fraction accounts for less than 85 weight % of the multi-modal polymer blend.

Paragraph N: The multi-modal polymer blend of any of Paragraphs A-M, wherein the multi-modal polymer blend is a dual reactor blend.

Paragraph O: The multi-modal polymer blend of any of Paragraphs A-N, wherein the multi-modal polymer blend is a solution blend.

Paragraph P: The multi-modal polymer blend of any of Paragraphs A-N, wherein the multi-modal polymer blend is in a form of a polymeric pellet.

Paragraph Q: The multi-modal polymer blend of any of Paragraphs A-P, wherein the first predominantly propylene-based polymer comprises a copolymer of propylene and ethylene, and the second predominantly propylene-based polymer comprises a copolymer of propylene and ethylene.

Paragraph R: The multi-modal polymer blend of any of Paragraphs A-Q, wherein the first predominantly propylene-based polymer and the second predominantly propylene-based propylene polymer have a difference in heat of fusion of at least 10 J/g.

Paragraph S: The multi-modal polymer blend of Paragraph R, wherein the first predominantly propylene-based polymer and the second predominantly propylene-based propylene polymer have a difference in heat of fusion of at least 20 J/g.

Paragraph T: The multi-modal polymer blend of any of Paragraphs A-S, wherein the first predominantly propylene-based polymer and the second predominantly propylene-based propylene each have a Mw of about 10,000 to about 100,000 g/mol.

Paragraph U: The multi-modal polymer blend of any of Paragraphs A-T, wherein the hydrocarbon solvent is xylene.

Paragraph V: The multi-modal polymer blend of any of Paragraphs A-T, wherein the hydrocarbon solvent is ortho-dichlorobenzene.

Paragraph W: An adhesive comprising the multi-modal polymer blend of any of Paragraphs A-V.

Paragraph X: A hot melt adhesive comprising the multi-modal polymer blend of any of Paragraphs A-V.

EXAMPLE ONE

In a pilot plant, propylene-ethylene copolymers were produced by reacting a feed stream of propylene with a feed stream of ethylene in the presence of the catalyst of Formula (I). The feed rates and feed temperature were controlled to produce a copolymer with a target heat of fusion of about 45 J/g. Over the duration of the run, melt viscosity was ramped down from about 20,000 cP to about 1000 cP by increasing the reactor temperature.

The reactor product stream containing 9-16% polymer by weight was heated to between about 200° C. and about 205° C. at a pressure of about 1600 psig. The stream was fed to a high-pressure separator where the operating pressure was 600 psig. The drop in pressure induced the stream to a two phase region beyond the lower critical solution temperature, separating the product into two liquid phases based on density. After settling, the product stream separated into a polymer rich phase that exited the bottom of the high-pressure separator and a polymer lean phase that exited overhead in the high-pressure separator.

Over the duration of the run, the molecular weight of the product was continuously reduced and the amount of polymer in the lean phase also reduced. These results are counterintuitive because the lower molecular weight polymers have larger amounts of polymers that are less than 10,000 g/mol, and, thus, higher amounts of polymer were expected to be found in the polymer lean phase as molecular weight was reduced. Without being bound by theory, it is believed that higher levels of unreacted propylene helped the polymer partition better into the rich phase and kept the polymer concentration in the lean phase low. Thus, the use of the high-pressure separator with propylene-based polymers, particularly under low reactor conversion conditions in which a large concentration of unreacted propylene remains in the product stream improves the separation in the high-pressure separator and reduces or avoids the problems associated with polymer being removed from the product stream and carried through the recirculation loop.

Figure 4:
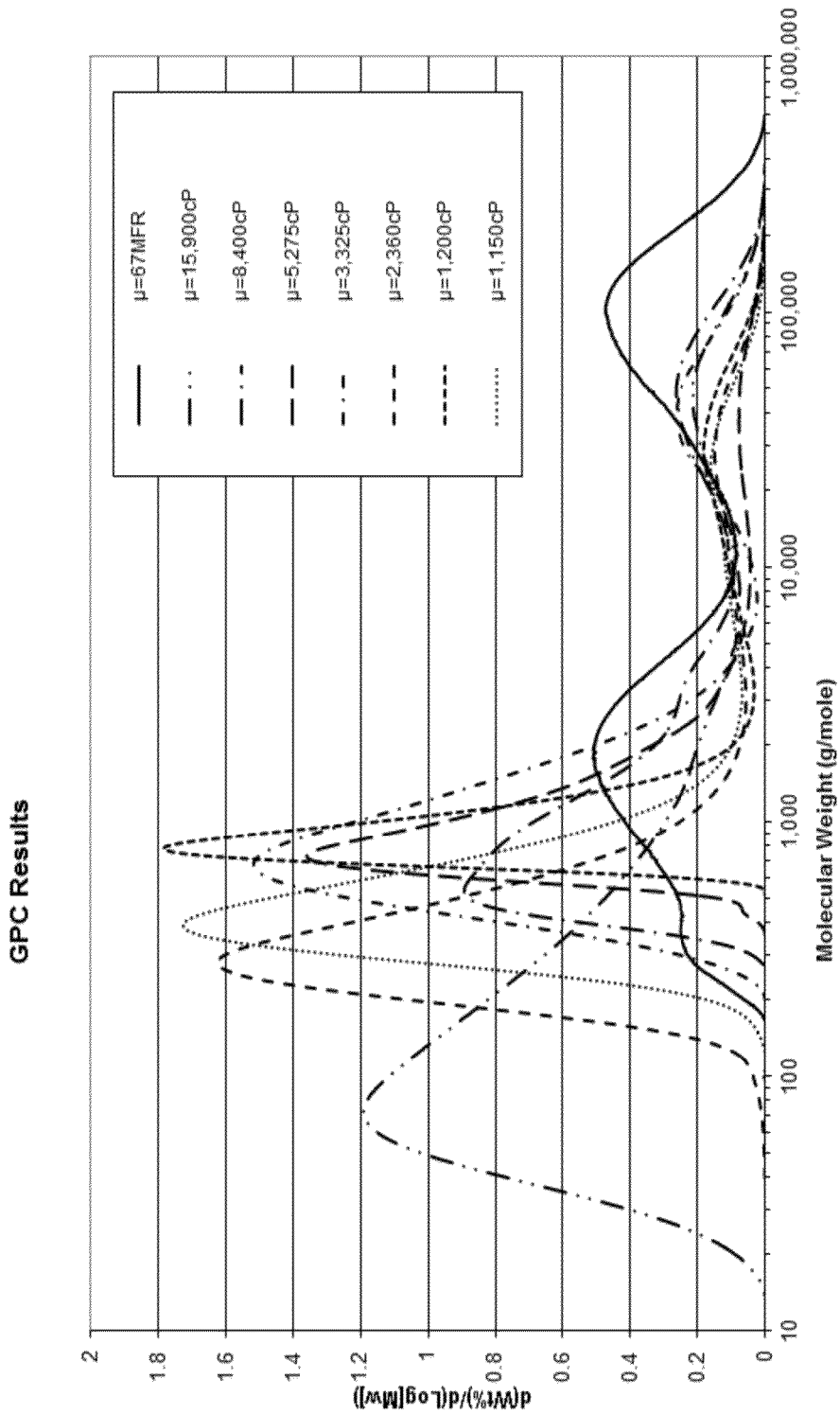
FIG. 4 is a Gel Permeation Chromatography graph illustrating the molecular weight distribution of polymer samples collected from the polymer lean phase of a high-pressure separator.

Polymer samples were obtained from the lean phase and where analyzed with Gel Permeation Chromatography (GPC) to determine the molecular weight distribution of the polymer in the lean phase. The results of this analysis are illustrated in FIG. 4. As seen in FIG. 4, as the viscosity of the polymer was lowered, the molecular weight distribution of the polymer in the lean phase is lowered. The cut-off molecular weight also shifts to a lower value (from about 10,000 g/mol to about 2,000 g/mol in FIG. 4). Thus, it can be seen that such separation is particularly effective for propylene-based polymers having a weight average molecular weight of about 100,000 g/mol or less, and even more for propylene-based polymers having a weight average molecular weight of about 60,000 g/mol or less.

EXAMPLE TWO

The concentration of polymer in the lean phase of the high-pressure separator was also analyzed for a two reactor system in a pilot plant. Five different catalyst regimes were evaluated. In each regime, the polymer's melt viscosity was held constant at about 2,000 cP.

In a first regime, propylene-ethylene copolymers were produced using the catalyst of Formula (I) in a single reactor. Copolymers were produced having heats of fusion of about 10 J/g, 25 J/g, 35 J/g, and 45 J/g. The heat of fusion of the copolymer was varied during the run by control of comonomer feed rate and feed temperatures.

In a second regime, propylene-ethylene copolymers were produced using the catalyst of Formula (II) in a single reactor. Copolymers were produced having heats of fusion of about 25 J/g and about 70 J/g. The heat of fusion of the copolymer was varied during the run by control of comonomer feed rate and feed temperatures.

In a third regime, propylene-ethylene copolymers were produced in two reactors using the catalyst of Formula (II) and were then blended. The overall heat of fusion of the blended copolymer was about 45 J/g.

In a fourth regime, propylene-ethylene copolymers were produced in two reactors. In one reactor, the copolymer was produced using the catalyst of Formula (I) and in the second reactor, the copolymer was produced using the catalyst of Formula (II). The overall heat of fusion of the blended copolymer was about 45 J/g.

In a fifth regime, propylene copolymers were produced in two reactors using the catalyst of Formula (I) and were then blended. The overall heat of fusion of the blended copolymer was about 45 J/g.

For each regime, the reactor product stream containing 9-16% polymer by weight was heated to between about 200° C. and about 205° C., at a pressure of about 1600 psig. The stream was fed to a high-pressure separator where the operating pressure was 600 psig. The drop in pressure induced the stream to a two phase region beyond the lower critical solution temperature, separating the product into two liquid phases based on density. After settling, the product stream separated into a polymer rich phase that exited the bottom of the high-pressure separator and a polymer lean phase that exited overhead in the high-pressure separator.

Figure 5:
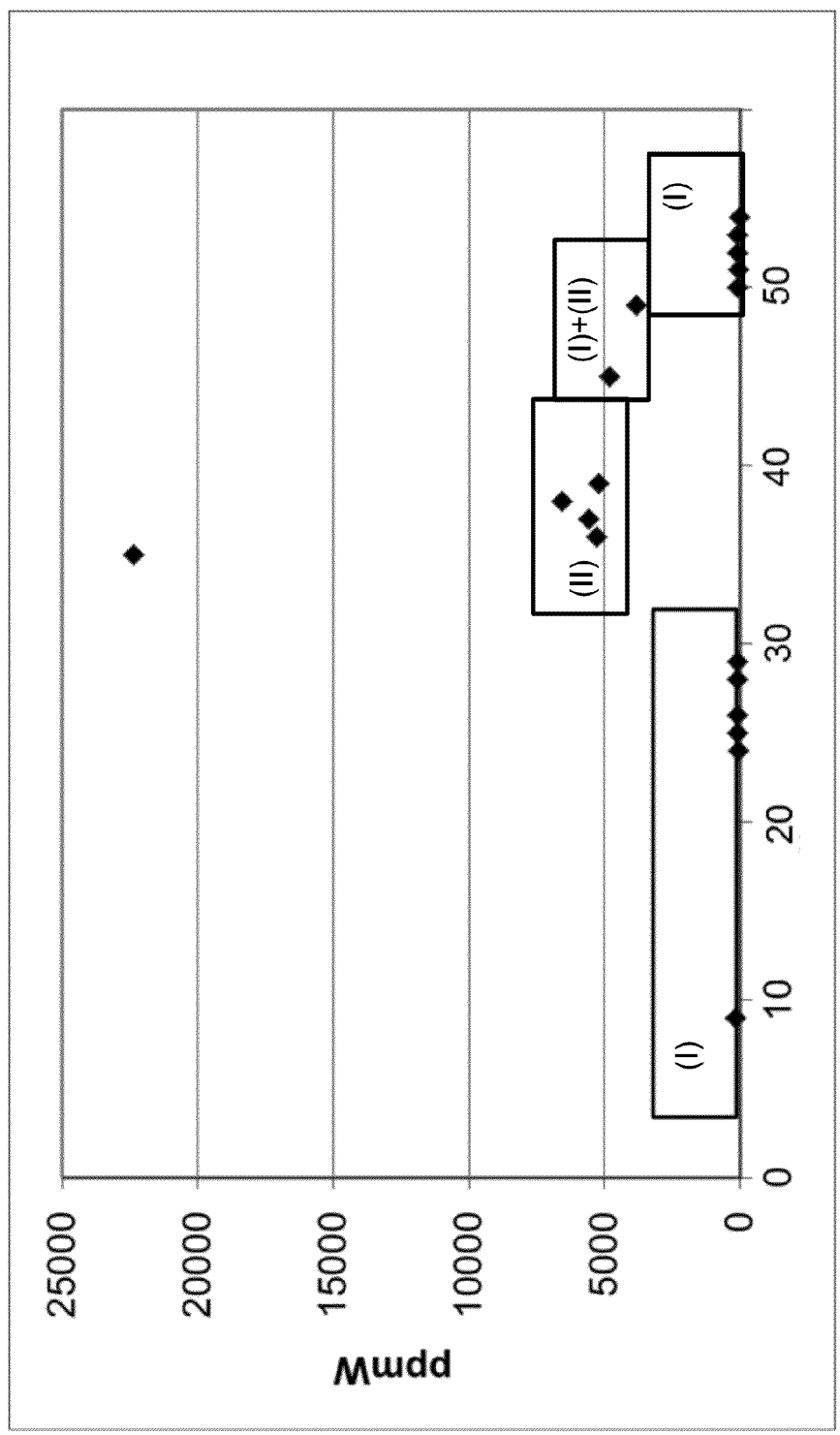
FIG. 5 is a graph illustrating the concentration of polymer in the lean phase of a high-pressure separator.

Lean phase polymer concentrations were analyzed for each run. As illustrated in FIG. 5, the lean phase polymer concentration was low for all runs except for a sample that was taken shortly after the initiation of the regime using the catalyst of Formula II. The polymers involving the catalyst of Formula (I) were all made at lower monomer conversion than the polymers involving the catalyst of Formula (II), resulting in higher monomer concentration in the high-pressure separator. The fact that the concentration of polymer in the lean phase was close to zero for the polymers produced with the catalyst of Formula (I) was particularly surprising.

EXAMPLE THREE

In Example Three, inventive polymers and comparative examples are characterized.

Polymer A is a propylene-based polymer with an ethylene comonomer produced in accordance with the foregoing description and is a single reactor product produced using rac-dimethylsilyl-bis(indenyl)hafnium dimethyl as a catalyst under propylene polymerization conditions. The comonomer wt % (Wt % C2), heat of fusion (Hf), Brookfield Viscosity (BV) at 190° C., weight average molecular weight to number average molecular weight ratio, or polydispersity (Mw/Mn), branching index (g'), crystallization temperature (Tc), and melting temperature (Tm) for Polymer A are illustrated in Table 1.

Polymer B is a propylene-based polymer with an ethylene comonomer produced in a lab-scale continuous reactor using rac-dimethylsilyl-bis(indenyl)hafnium dimethyl as a catalyst under propylene polymerization conditions. The comonomer wt % (Wt % C2), heat of fusion (Hf), Brookfield Viscosity (BV), weight average molecular weight to number average molecular weight ratio, or polydispersity (Mw/Mn), branching index (g'), crystallization temperature (Tc), and melting temperature (Tm) for Polymer B are illustrated in Table 1

Polymer C is a propylene-based polymer with an ethylene comonomer produced in accordance with the foregoing description and is a dual parallel reactor product produced using rac-dimethylsilyl-bis(2-methyl-4-phenylindenyl)zirconium dimethyl as a catalyst in each reactor under propylene polymerization conditions. The comonomer wt % (Wt % $C_2$), heat of fusion (Hf), Brookfield Viscosity (BV), light scattering weight average molecular weight (LS Mw), weight average molecular weight to number average molecular weight ratio, or polydispersity (Mw/Mn), branching index (g'), crystallization temperature (Tc), and melting temperature (Tm) for Polymer C are illustrated in Table 1.

Comparatives D-H are samples of commercial polymer sold by ExxonMobil Chemical Company at different times as LINXAR™ 127 polymer. The comonomer wt % (Wt % $C_6$), heat of fusion (Hf), Brookfield Viscosity (BV), glass transition temperature (Tg), crystallization temperature (Tc), and melting temperature (Tm) for Comparatives D-H are illustrated in Table 2.

Comparative I is another sample of a commercial polymer sold by ExxonMobil Chemical Company as LINXAR™ 127 polymer. The comonomer wt % (Wt % $C_6$), heat of fusion (Hf), Brookfield Viscosity (BV), glass transition temperature (Tg), crystallization temperature (Tc), and melting temperature (Tm) for Comparative I are illustrated in Table 2. Comparative I also has a light scattering (LS) $M_w$ of 45 kg/mol, a DRI $M_w/M_n$ of 4.2, and a g' of 0.82.

TABLE 1

Inventive Polymers

|  | Wt % $C_2$ | $H_f$, J/g | BV, cp | LS $M_w$, kg/mol | DRI $M_w/M_n$ | g' | $T_c$, ° C. | $T_m$, ° C. |
|---|---|---|---|---|---|---|---|---|
| Polymer A | 5.1 | 37 | 1150 | 28 | 2.41 | 0.948 | 50 | 91 |
| Polymer B | 11 | 15 | 2600 | 30 | 2.18 | 0.906 | 22 | 60 |
| Polymer C | 11 | 37 | 960 | 27 | 2.73 | 0.894 | 71 | 111 |

TABLE 2

Comparative Examples

|  | Wt % $C_6$ | $H_f$, J/g | BV, cp | $T_g$, ° C. | $T_c$, ° C. | $T_m$, ° C. |
|---|---|---|---|---|---|---|
| Comparative D | 9-10 | 32 | 880 | −14 | 32, 55 | 124 |
| Comparative E | 9-10 | 38 | 880 | −15 | 37, 52 | 129 |
| Comparative F | 9-10 | 37 | 932 | −14 | 59, 73 | 128 |
| Comparative G | 9-10 | 32 | 922 | −15 | 37, 50 | 128 |
| Comparative H | 9-10 | 39 | 1315 | −13 | 34, 48 | 114 |
| Comparative I | 9-10 | 35 | 1565 | −9.1 | 62 | 120 |

Several of the inventive polymers (Polymers A-C) and comparative examples (Comparative D, E, and G-I) were analyzed by the combined Temperature Rising Elution Fractionation and Gel Permeation Chromatography ("TREF-GPC") method. TREF-GPC was performed using a CFC-2 instrument from Polymer Char (Valencia, Spain), and the instrument was operated and subsequent data processing (e.g., smoothing parameters, setting baselines, and defining integration limits) was done according to the manner described in the CFC User Manual provided with the instrument or in a manner commonly used in the art. The CFC-2 instrument was equipped with a TREF column (stainless steel; outer diameter, ⅜"; length, 15 cm; packing, non-porous stainless steel micro-balls) in the first dimension and a GPC column set (3×PLgel 10 µm Mixed B column from Polymer Labs, UK) in the second dimension. Downstream from the GPC column was an infrared detector (IR4 from Polymer Char) capable of generating an absorbance signal that is proportional to the concentration of polymer in solution.

The sample to be analyzed was dissolved in a hydrocarbon solvent, such as ortho-dichlorobenzene (concentration~2.5 mg/ml), by stirring at 150° C. for 75 min. Then a 0.5-ml volume of the solution containing 1.25 mg of polymer was loaded in the center of the TREF column and the column temperature was reduced and stabilized at 80 to 100° C. for 30 min. Then the column was cooled slowly (0.2° C./min) to −15° C. (for cryogenic runs) to crystallize the polymer on the inert support. The low temperature was held for 10 min before injecting the soluble fraction into the GPC column. All GPC analyses were done using solvent ortho-dichlorobenzene at 1 ml/min, a column temperature of 140° C., and in the "Overlap GPC Injections" mode. Then the subsequent higher-temperature fractions were analyzed by increasing the TREF column temperature to the fraction set-points in a stepwise manner, letting the polymer dissolve for 16 min ("Analysis Time"), and injecting the dissolved polymer into the GPC column for 3 min ("Elution Time").

The universal calibration method was used for determining the molecular mass of eluting polymers. Thirteen narrow molecular-weight distribution polystyrene standards (obtained from Polymer Labs, UK) within the range of 1.5-8200 kg/mol were used to generate a universal calibration curve. Mark-Houwink parameters were obtained from Appendix I of "Size Exclusion Chromatography" by S. Mori and H. G. Barth (Springer). For polystyrene: K=1.38×10$^{-4}$ dl/g and α=0.7; and for polyethylene: K=5.05×10$^{-4}$ dl/g and α=0.693. Fractions having a weight % recovery (as reported by the instrument software) of less than 0.5% were not processed for calculations of molecular-weight averages ($M_n$, $M_w$, etc.) of the individual fractions or of aggregates of fractions.

As illustrated in Table 3, all of the analyzed inventive polymers and comparative examples exhibited a soluble fraction and one or two crystallized fractions. Each temperature in the table represents the elution temperature of a fraction. The parenthesis next to the elution temperature shows the amount of the polymer present in the fraction (wt %), the weight average molecular weight (Mw), and the polydispersity index (Mw/Mn) of that fraction at this elution temperature. The soluble fractions of all these polymeric systems have broad MWD, with polydispersity index greater than 4.0. One distinction between the inventive polymers and the comparative examples that the inventive polymers exhibited a relatively smaller amount of the polymer present in "Crystallized Fraction 1," whereas the comparative examples has a large amount of the polymer present in "Crystallized Fraction 1." Another compositional difference between the inventive polymers and the comparative examples is that, for both the Soluble Fraction and the Crystallized Fraction 1, the inventive polymers exhibit narrower PDIs compared to the comparative examples. On the other hand, a reverse behavior is seen for the Crystallized Fraction 2.

differences between the polymers can be easily observed by a visual comparison of the curves.

To further illustrate compositional characteristics of the inventive polymer, a representative example of the inventive polymer (Polymer C) was fractionated into two fractions in xylene: the −15° C. soluble and insoluble fractions (soluble: insoluble weight ratio of 64.2:35.8). Based on TREF measurements, the −15° C. soluble fraction did contain 100% soluble fraction without showing any crystallized component. $^{13}$C NMR and GPC-3D studies were carried out for these two fractions and results are shown in Table 4. The tacticity and insertion data of Table 4 was obtained using the procedure described in EP 0629632B1, particularly paragraphs [0167]-[0190], which is incorporated by reference herein.

TABLE 4

$^{13}$C NMR and GPC-3D Compositional Analysis of Inventive Polymer

| Polymer C | Wt % $C_2$ | Triad Tacticity, mol % mm | Tacticity Index (m/r) | Mol % Propylene 2,1 Insertion | Mol % Propylene 1,3 Insertion | LS Mw, kg/mol | DRI Mw/Mn | g' |
|---|---|---|---|---|---|---|---|---|
| −15° C. Soluble Fraction | 13.3 | 88.8 | 11.0 | 0.31 | 0.26 | 26 | 2.6 | 0.89 |
| −15° C. Insoluble Fraction | 4.3 | 94.0 | 24.3 | 0.34 | 0.37 | 33 | 2.1 | 0.85 |

TABLE 3

TREF-GPC Analysis of Inventive Polymers and Comparative Examples

| | Soluble Fraction | Crystallized Fraction 1 | Crystallized Fraction 2 |
|---|---|---|---|
| Polymer A | −15° C. (Area = 11.8%; Mw = 6.2k, Mw/Mn = 8.0) | 39° C. (Area = 88.2%; Mw = 29k, Mw/Mn = 1.8) | |
| Polymer B | −15° C. (Area = 75.9%; Mw = 21k, Mw/Mn = 4.7) | 11° C. (Area = 24.1%; Mw = 30k, Mw/Mn = 1.8) | |
| Polymer C | −15° C. (Area = 55.1%; Mw = 26k, Mw/Mn = 4.2) | 12° C. (Area = 13.5%; Mw = 34k, Mw/Mn = 2.2) | 66° C. (Area = 31.4%; Mw = 53k, Mw/Mn = 3.2 |
| Comparative D | −15° C. (Area = 28.3%; Mw = 23k, Mw/Mn = 6.6) | 16° C. (Area = 41.1%; Mw = 49k, Mw/Mn = 3.0) | 73° C. (Area = 30.6%; Mw = 36k, Mw/Mn = 2.0) |
| Comparative E | −15° C. (Area = 24.2%; Mw = 20k, Mw/Mn = 6.1) | 18° C. (Area = 41.6%; Mw = 49k, Mw/Mn = 2.7) | 78° C. (Area = 34.2%; Mw = 39k, Mw/Mn = 2.0) |
| Comparative G | −15° C. (Area = 22.4%; Mw = 19k, Mw/Mn = 6.2) | 16° C.(Area = 41.0%; Mw = 46k, Mw/Mn = 2.7) | 77° C. (Area = 36.6%; Mw = 40k, Mw/Mn = 1.9) |
| Comparative H | −15° C. (Area = 13.6%; Mw = 16k, Mw/Mn = 6.8) | 46° C. (Area = 72.9%; Mw = 55k, Mw/Mn = 2.3) | 72° C. (Area = 13.5%; Mw = 42k, Mw/Mn = 1.9) |
| Comparative I | −15° C. (Area = 18.9%; Mw = 23k, Mw/Mn = 7.5) | 36° C. (Area = 61.1%; Mw = 55k, Mw/Mn = 2.5) | 71° C. (Area = 20.0%; Mw = 40k, Mw/Mn = 1.9) |

Figure 6:
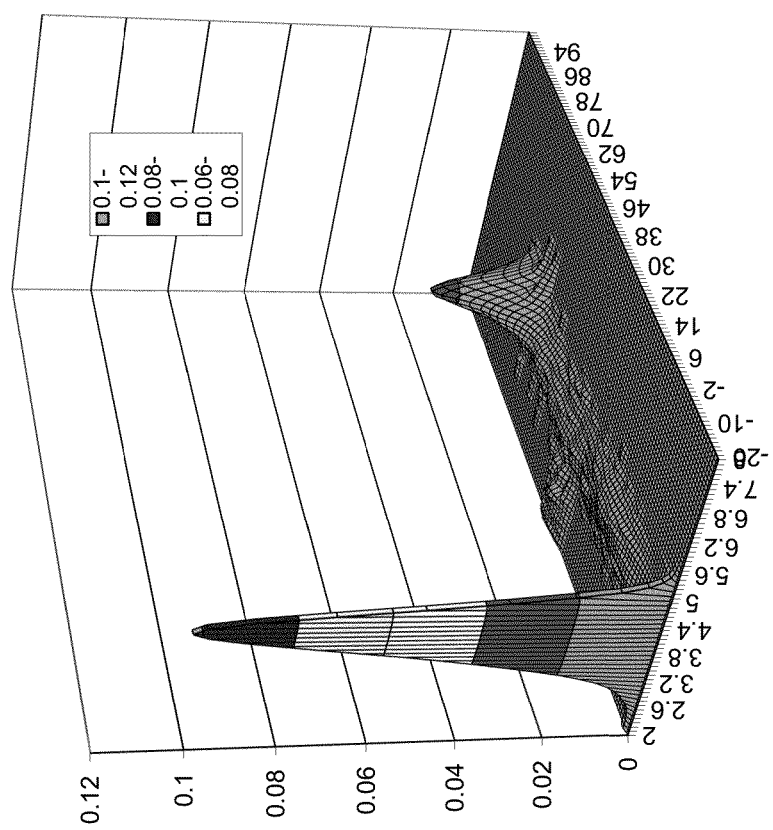
FIG. 6 is a TREF-GPC graph illustrating an inventive polymer according to one or more embodiments of the present invention; the horizontal axes are log(molecular weight) and temperature in ° C.
Figure 7:
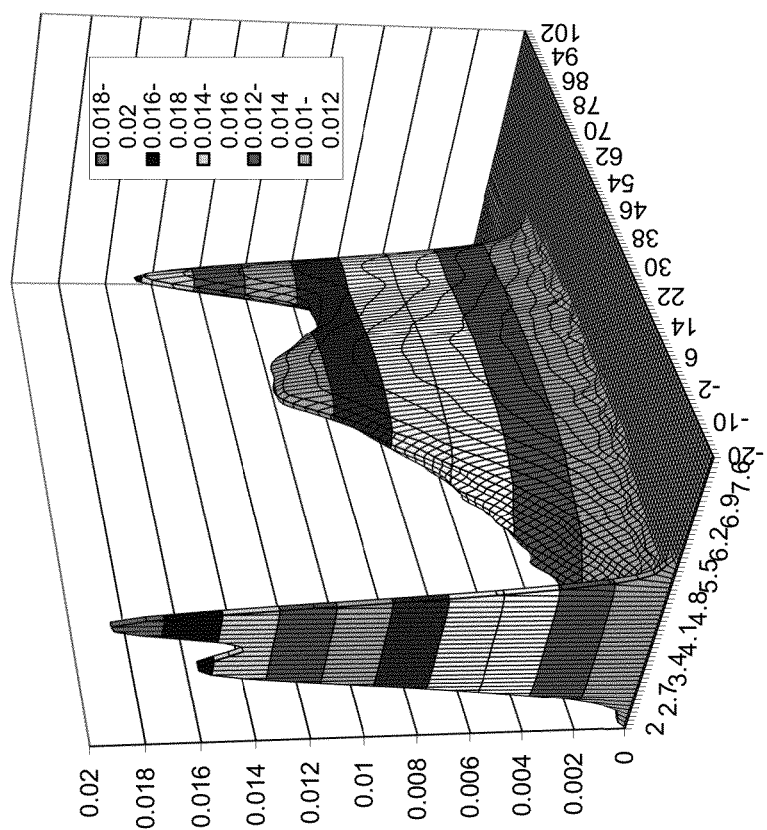
FIG. 7 is a TREF-GPC graph illustrating a comparative polymer; the horizontal axes are log(molecular weight) and temperature in ° C.

The TREF-GPC curves for Polymer C and Comparative I are shown in FIGS. 6 and 7, respectively. Their compositional For purposes of comparison, a representative example of the comparative polymers (Comparative I) was fractionated in ortho-dichlorobenzene. $^{13}$C NMR and GPC-3D studies were carried out for the resulting fractions and results are shown in Table 5. Based on TREF measurements, each of these fractions at −10° C. and 0° C. contained 100% soluble fraction without showing any crystallized component. Therefore, these fractions at −10 and 0° C. were combined and analyzed together as reported as Fraction (0° C.) in Table 5. Also, a fraction at 120° C. was obtained and was analyzed and reported as Fraction (120° C.) in Table 5. The data of Table 5 was obtained using the procedure described in J. C. Randall, Polymer Reviews, 1989, 29:2, 201-317 and T. Sugano, Y. Gotoh, and T. Fujita, Makromol. Chem., 1992, 193, 43-51. The weight ratio of Fraction (0° C.) and Fraction (120° C.) was about 8.78:77.9. Both fractions exhibited a lower percentage of mass recovery than the two fractions of Polymer C.

TABLE 5

$^{13}$C NMR and GPC-3D Compositional Analysis of Comparative Polymer

| Comparative I | Mol % $C_6$ | Wt % $C_6$ | Triad Tacticity, mol % mm | LS $M_w$, kg/mol | DRI $M_w/M_n$ | g' |
|---|---|---|---|---|---|---|
| Fraction (0° C.) | 7.2 | 13.5 | 55.2 | 24 | 3.3 | 1.00 |
| Fraction (120° C.) | 5.3 | 10.0 | 81.5 | 51 | 2.6 | 0.81 |
| Whole Polymer | 6.3 | 11.8 | 75.7 | 45 | 4.2 | 0.82 |

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A multi-modal polymer blend for use in an adhesive composition, wherein the blend comprises:
   a first propylene-based polymer, wherein the first propylene-based polymer is a homopolymer of propylene or a copolymer of propylene and ethylene or a $C_4$ to $C_{10}$ alpha-olefin;
   a second propylene-based polymer, wherein the second propylene-based polymer is a homopolymer of propylene or a copolymer of propylene and ethylene or a $C_4$ to $C_{10}$ alpha-olefin;
   wherein the second propylene-based polymer is different than the first propylene-based polymer;
   wherein the multi-modal polymer blend has a Mw of about 10,000 g/mol to about 150,000 g/mol; and
   wherein, when subjected to Temperature Rising Elution Fractionation, the multi-modal polymer blend exhibits:
   a first fraction that is soluble at $-15°$ C. in xylene, the first fraction having an isotactic (mm) triad tacticity of about 70 mol % to about 90 mol %; and
   a second fraction that is insoluble at $-15°$ C. in xylene, the second fraction having an isotactic (mm) triad tacticity of about 85 mol % to about 98 mol %.

2. The multi-modal polymer blend of claim 1, wherein the first fraction comprises a first portion of the first propylene-based polymer and a first portion of the second propylene-based polymer.

3. The multi-modal polymer blend of claim 1, wherein the second fraction comprises a second portion of the first propylene-based polymer and a second portion of the second propylene-based polymer.

4. The multi-modal polymer blend of claim 1, wherein the first propylene-based polymer has an isotactic (mm) triad tacticity of about 70 mol % to about 98 mol %.

5. The multi-modal polymer blend of claim 4, wherein the second propylene-based polymer has an isotactic (mm) triad tacticity of about 70 mol % to about 98 mol %.

6. The multi-modal polymer blend of claim 1, wherein the first fraction accounts for less than 90 weight % of the multi-modal polymer blend.

7. The multi-modal polymer blend of claim 1, further comprising a third fraction having an elution temperature greater than 60° C.

8. The multi-modal polymer blend of claim 1, wherein the multi-modal polymer blend has a Mw of about 10,000 to about 100,000 g/mol.

9. The multi-modal polymer blend of claim 1, wherein the first fraction has a Mw/Mn of at least 2.5.

10. The multi-modal polymer blend of claim 9, wherein the first fraction has a Mw/Mn of at least 4.0.

11. The multi-modal polymer blend of claim 10, wherein the first fraction has a Mw/Mn of at least 4.5.

12. The multi-modal polymer blend of claim 1, wherein the first fraction accounts for less than 85 weight % of the multi-modal polymer blend.

13. The multi-modal polymer blend of claim 1, wherein the multi-modal polymer blend is a dual reactor blend.

14. The multi-modal polymer blend of claim 1, wherein the multi-modal polymer blend is a solution blend.

15. The multi-modal polymer blend of claim 1, wherein the multi-modal polymer blend is in a form of a polymeric pellet.

16. The multi-modal polymer blend of claim 1, wherein the first propylene-based polymer comprises a copolymer of propylene and ethylene, and the second propylene-based polymer comprises a copolymer of propylene and ethylene.

17. The multi-modal polymer blend of claim 1, wherein the multi-modal polymer blend has a heat of fusion between about 10 J/g to about 90 J/g.

18. The multi-modal polymer blend of claim 1, wherein the first propylene-based polymer and the second propylene-based propylene polymer have a difference in heat of fusion of at least 10 J/g.

19. The multi-modal polymer blend of claim 1, wherein the first propylene-based polymer and the second propylene-based propylene polymer have a difference in heat of fusion of at least 20 J/g.

20. The multi-modal polymer blend of claim 1, wherein the first propylene-based polymer and the second propylene-based propylene each have a Mw of about 10,000 to about 100,000 g/mol.

21. An adhesive comprising the multi-modal polymer blend of claim 1.

22. A multi-modal polymer blend for use in an adhesive composition, wherein the blend comprises:
   a first propylene-based polymer, wherein the first propylene-based polymer is a homopolymer of propylene or a copolymer of propylene and ethylene or a $C_4$ to $C_{10}$ alpha-olefin;
   a second propylene-based polymer, wherein the second propylene-based polymer is a homopolymer of propylene or a copolymer of propylene and ethylene or a $C_4$ to $C_{10}$ alpha-olefin;
   wherein the second propylene-based polymer is different than the first propylene-based polymer;
   wherein the multi-modal polymer blend has a Mw of about 10,000 g/mol to about 150,000 g/mol; and
   wherein, when subjected to Temperature Rising Elution Fractionation, the multi-modal polymer blend exhibits:
   a first fraction that is soluble at $-15°$ C. in a hydrocarbon solvent selected from one of xylene and ortho-dichlorobenzene, the first fraction having an isotactic (mm) triad tacticity of about 70 mol % to about 90 mol %; and
   a second fraction that is insoluble at $-15°$ C. in the hydrocarbon solvent, the second fraction having an isotactic (mm) triad tacticity of about 85 mol % to about 98 mol %.

23. A multi-modal polymer blend for use in an adhesive composition, wherein the blend comprises:
   a first propylene-based polymer, wherein the first propylene-based polymer is a homopolymer of propylene or a copolymer of propylene and ethylene or a $C_4$ to $C_{10}$ alpha-olefin;
   a second propylene-based polymer, wherein the second propylene-based polymer is a homopolymer of propylene or a copolymer of propylene and ethylene or a $C_4$ to $C_{10}$ alpha-olefin;

wherein the second propylene-based polymer is different than the first propylene-based polymer;

wherein the multi-modal polymer blend has a Mw of about 10,000 g/mol to about 150,000 g/mol; and wherein, when subjected to Temperature Rising Elution Fractionation, the multi-modal polymer blend exhibits:

a first fraction that is soluble at −15° C. in ortho-dichlorobenzene, the first fraction having an isotactic (mm) triad tacticity of about 70 mol % to about 90 mol %; and a second fraction that is insoluble at −15° C. in ortho-dichlorobenzene, the second fraction having an isotactic (mm) triad tacticity of about 85 mol % to about 98 mol %.

* * * * *